June 6, 1967 L. J. MARHOEFER 3,323,722
PURE FLUID SHIFT REGISTER
Filed Dec. 9, 1965
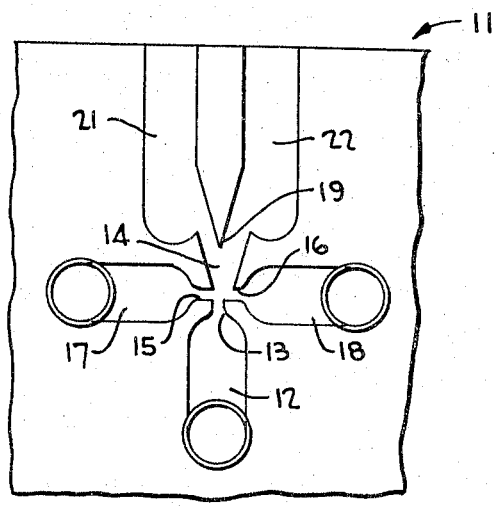
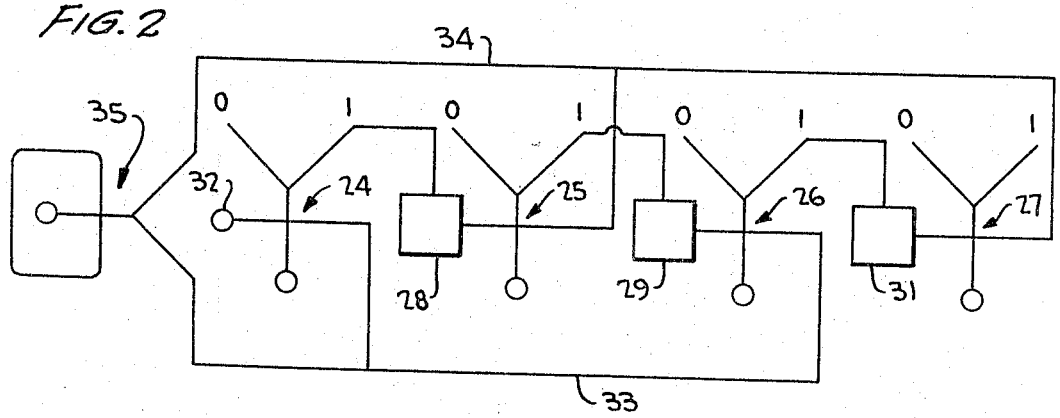
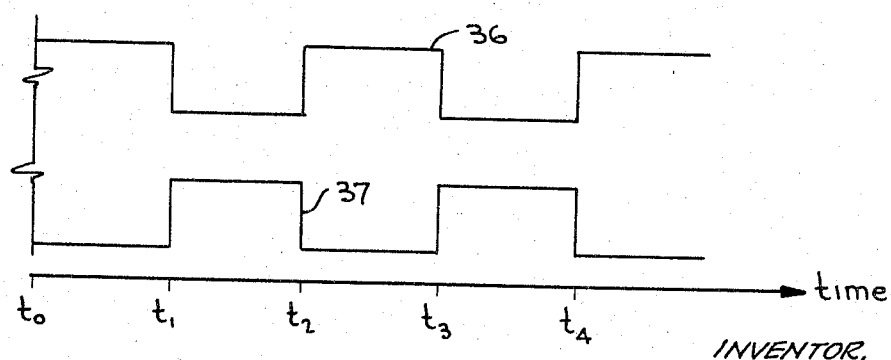
INVENTOR,
LAURENCE J. MARHOEFER
BY: Harry M. Saragovitz,
Edward J. Kelly,
Herbert Berl &
Theodore Blumenstock

United States Patent Office 3,323,722
Patented June 6, 1967

3,323,722
PURE FLUID SHIFT REGISTER
Laurence J. Marhoefer, Jackson Heights, N.Y., assignor to the United States of America as represented by the Secretary of the Army
Filed Dec. 9, 1965, Ser. No. 512,833
1 Claim. (Cl. 235—201)

ABSTRACT OF THE DISCLOSURE

A pure fluid shift register includes one bistable amplifier per stage with successive stages interconnected by a pure fluid capacitance which provides a small time delay of a fluid signal between stages. Adjacent stages are driven by complementary shift pulses.

The invention described herein may be manufactured and used by or for the Government of the United States of America for governmental purposes without the payment to me of any royalty thereon.

This invention relates to shift registers, and more particularly to pure fluid shift registers.

Recently, there has developed a new technology in which computation and control is accomplished by pure fluid devices. Since many military and industrial systems and processes involve fluids in motion, this technology is uniquely adapted to a wide variety of applications. For example, rocket thrust rectoring and control of chemical processes have been proposed using pure fluid devices. In the medical field, an artificial heart has been constructed using a pure fluid amplifier at the Harry Diamond Laboratories in Washington, D.C. Pure fluid devices offer many advantages over their mechanical and electronic counterparts. Specifically, they operate reliably under adverse conditions withstanding shock, vibration, extremes of temperature, and nuclear radiation. As a result of the great potential offered by pure fluid devices, considerable sums of money have been expended both by government and industry to further the research and development of these devices. Of course, the fruits of these expenditures will not be realized unless the newly-developed pure fluid devices are assimilated into operative systems. The tendecy, however, is for systems to become too complex resulting in inefficiency and lower reliability.

It is therefore an object of the instant invention to provide a system of pure fluid devices which is extremely simple and highly reliable owing to the use of a minimum number of pure fluid devices.

More specifically, it is an object of this invention to provide a pure fluid shift register which is characterized by simplicity of construction, economy of manufacture, and efficiency and reliability of operation.

According to the present invention, the foregoing and other objects are attained by providing a pure fluid shift register having only one bistable pure fluid device per stage, successive stages being interconnected by a pure fluid capacitance which provides a small time delay of a fluid signal between stages, and adjacent stages being driven by complementary shift pulses.

The specific nature of the invention, as well as other objects, uses and advantages thereof, will clearly appear from the following description and from the accompanying drawing, in which:

FIG. 1 is a planar view of bistable, pure fluid amplifier which may be employed in the preferred embodiment of the invention.

FIG. 2 is a schematic diagram of the pure fluid shift register according to the invention.

FIG. 3 is a graphical representation of the complementary shift pulses used in practicing the invention.

Referring now to the drawing and more particularly to FIGURE 1, there is shown a bistable pure fluid amplifier 11 which may be fabricated by any of several well known methods. Amplifier 11 has a power channel 12 which constricts to form a power nozzle 13. Nozzle 13 is positioned to issue a power stream into interaction chamber 14. Left and right control nozzles 15 and 16, respectively, are diametrically opposed one another and located slightly downstream from power nozzle 13. Control nozzles 15 and 16 are supplied by left and right control channels 17 and 18, respectively, and are positioned to issue control streams perpendicularly against a power stream emanating from power nozzle 13. Positioned downstream from power nozzle 13 and axially aligned therewith is a stream splitter 19. The side walls of interaction chamber 14 and the stream splitter 19 define the entrances to output left and right channels 21 and 22.

In operation, a power stream issuing from power nozzle 13 will attach to one or the other of the side walls of chamber 14. This is because the side walls are in close proximity to the power stream and fluid adjacent one of the walls will be entrained by the fast-moving power stream creating a pressure differential across the power stream. This phenomena is known as the Coanda effect. The power stream will then issue from one or the other of output channels 21 and 22 depending upon which wall of chamber 14 the power stream attaches. Control of the attachment of power stream to the side walls of chamber 14 is accomplished by issuing control streams against the power stream. For example, suppose that the power stream is attached to the left side wall of chamber 14, the power stream may be made to attach to the right side wall by causing a control stream to issue from left control nozzle 15.

At this point, it should be noted that the right side wall of interaction chamber 14 is set back from power nozzle 13; i.e. the right side wall is a greater distance from the axis of power nozzle 13 than is the left side wall. The effect produced by this set back is to bias the bistable device 11 so that the power stream will, when turned on in the absence of any control streams, attach to the left side wall. This is of particular importance in digital systems which comprise a large number of bistable elements 11. Assume that a fluid signal in the left output channel 21 is designated a binary "0" while a fluid signal in the right output channel 22 is designated a binary "1." When the power streams in a digital fluid system such as a large register, counter or memory section are turned on, the system will produce an output which represents a "cleared" state; that is, the system will contain no binary information. In this state the system is ready to begin functioning. Thus, the necessity of clearing the system preparatory to initiating operation is eliminated by the biased design of the pure fluid bistable device 11.

FIGURE 2 illustrates schematically the construction of a shift register according to the invention. Elements 24, 25, 26 and 27 each represent a pure fluid bistable device which are preferably, but not necessarily, of the type illustrated in FIGURE 1. Assuming the same convention as before, fluid signals in the left output channels of each of elements 24, 25, 26 and 27 represent binary "0's"; and signals in the right output channels, binary "1's." This is illustrated in the figure by a zero or a one over the appropriate output channels. Each bistable device comprises one stage of the shift register. Adjacent stages are connected together by a fluid capacitance represented here by elements 28, 29 and 31. The capacitances are each connected between the right output channel of one stage and the left control channel of the next succeeding stage. The left control channel of the first stage is connected at fluid input terminal 32 to a source (not shown) of digital fluid signals. Adjacent stages of the shift register are driven by complementary shift pulses, or, in other words, alternate stages are driven by identical shift pulses. Thus, the right control channels of elements 24 and 26 are connected to a common shift line 33, while the right control channels of elements 25 and 27 are connected to a common shift line 34. A pure fluid oscillator 35 is shown as supplying the shift pulses to lines 33 and 34. Fluid oscillator may comprise a bistable fluid device similar to that illustrated in FIGURE 1 but with no setback in the side walls of the interaction chamber. The right and let control channels are connected together with a length of closed line, the length of the line determining the frequency of the oscillator. The output fluid signals from oscillator 35 are represented graphically in FIGURE 3 wherein the pulses represented by curve 36 may be considered as those appearing in fluid shift line 34, and those represented by curve 37, as those in line 33. Obviously, any other source of complementary pulses may be used as the source of shift pulses in place of oscillator 35. In fact, in most applications it will be desirable that the shift pulses be nonperiodic; however, oscillator 35 serves the purpose of illustrating the operation of the present invention.

Referring to both FIGURES 2 and 3, assume that at time $t_0$ the first stage 24 of the shift register has an output from its "1" side caused by an input fluid signal at input terminal 32. All the remaining stages 25, 26 and 27 are in their "0" states. The high pressure in shift line 34 prevents stage 25 from switching to its "1" state as a result of an input signal from stage 24. At time $t_1$, a shift pulse appears in line 33 causing stage 24 to assume its "0" state. The corresponding reduction in pressure in line 34 allows stage 25 to switch to the "1" state due to the slightly delayed output signal from stage 24 through capacitance 28. The increased pressure in line 33 prevents the output from stage 25 from switching stage 26. The cycle then repeats for as many units as are in the register.

It will be apparent that the embodiments shown are only exemplary and that various modifications can be made in construction and arrangement within the scope of the invention as defined in the appended claim.

I claim as my invention:

A pure fluid shift register comprising:
(a) a plurality of pure fluid bistable devices corresponding in number to the number of stages of said shift register, each of said bistable devices having a first and second control channel and a first and second output channel,
(b) delay means interconnecting said bistable devices for producing a slight time delay in the fluid signal between the output of one stage and the input of the next succeeding stage, said delay means comprising a plurality of fluid capacitances corresponding in number to one less than the number of stages of said shift register, each of said capacitances being connected between the second output channel of the bistable element in one stage and the first control channel of the bistable element in the next succeeding stage, and
(c) shift means connected to each of said bistable devices for driving adjacent stages with complementary fluid shift pulses, said shift means including a pure fluid oscillator having first and second output channels, said oscillator first output channel being connected to the second control channel of the bistable element in alternate stages and said second oscillator output channel being connected to the second control channel of the bistable elements in the remaining stages.

References Cited
UNITED STATES PATENTS

| 3,201,041 | 8/1965 | Welsh | 235—201 |
| 3,221,990 | 12/1965 | Warren | 235—201 |
| 3,248,053 | 4/1966 | Phillips | 235—201 |

RICHARD B. WILKINSON, *Primary Examiner.*

L. R. FRANKLIN, *Assistant Examiner.*